G. ELIN.
CLOTH MEASURING AND INDICATING MACHINE.
APPLICATION FILED JAN. 28, 1911.
1,009,393.
Patented Nov. 21, 1911.
2 SHEETS—SHEET 1.
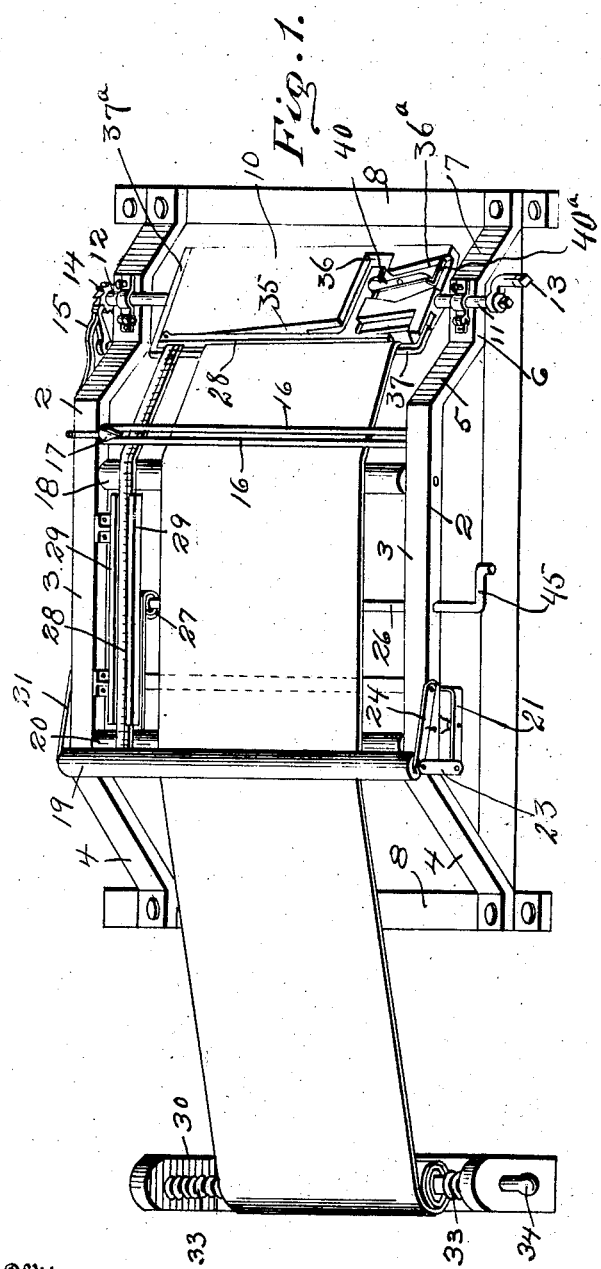
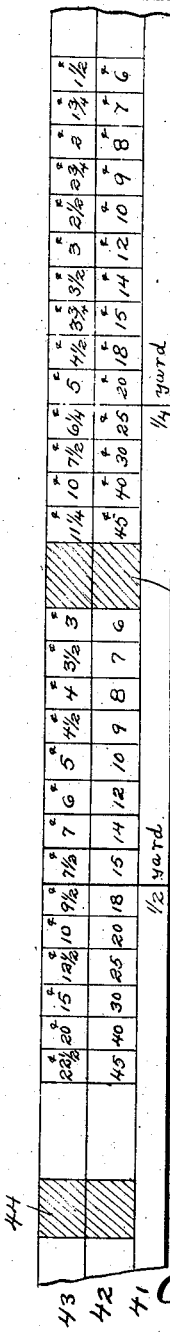
Witnesses
Inventor
G. Elin.
By
Attorneys.

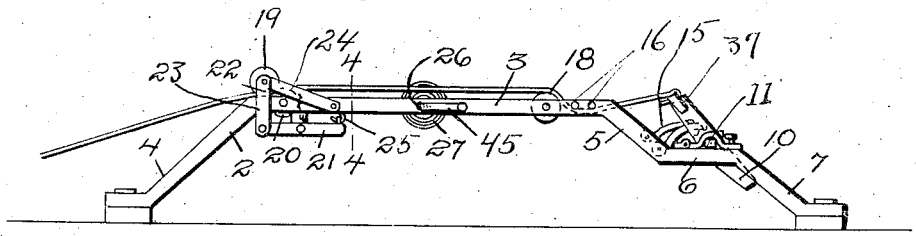
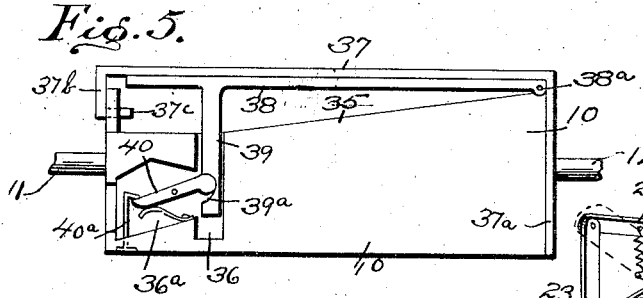
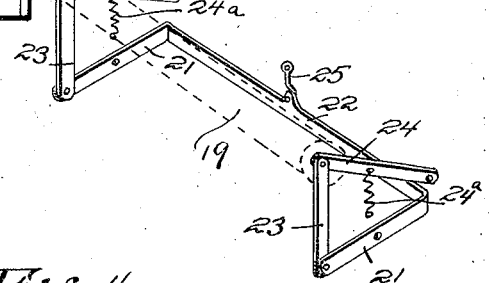
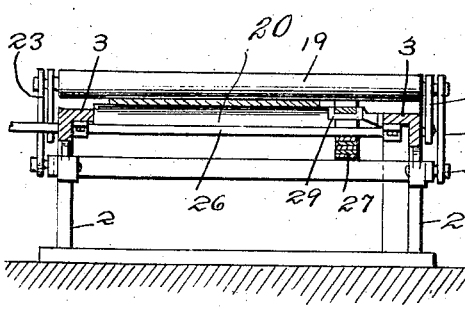
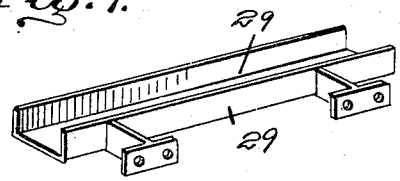
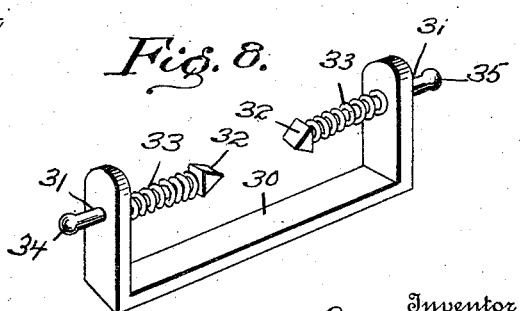

UNITED STATES PATENT OFFICE.

GODTHFREY ELIN, OF CAMBRIDGE, MINNESOTA.

CLOTH MEASURING AND INDICATING MACHINE.

1,009,393.

Specification of Letters Patent. Patented Nov. 21, 1911.

Application filed January 28, 1911. Serial No. 605,317.

*To all whom it may concern:*

Be it known that I, GODTHFREY ELIN, citizen of the United States, residing at Cambridge, in the county of Isanti and State of Minnesota, have invented certain new and useful Improvements in Cloth Measuring and Indicating Machines, of which the following is a specification.

My invention relates to cloth measuring devices, and the primary object of the invention is to provide a very simple and effective mechanism of this character in which the cloth is not only measured but the price of the piece cut off is immediately indicated.

A further object is to provide a machine of this character including a cloth winding device and a graduated tape which is wound up with the cloth upon the measuring reel, said tape having upon its face a plurality of series of graduations, the graduations of one series indicating the length of cloth which has been wound up, the graduations of another series indicating a plurality of prices per yard, and the graduations of another series indicating the various prices of fractions of a yard of cloth.

A further object is to provide a mechanism of this character with a scissors guide under which the cloth passes, this guide guiding the scissors in their cut across the cloth.

A further object is to provide a cloth measuring device with a measuring reel having clamps whereby the end of the cloth may be engaged with the reel, these clamps being so formed that the cloth may be readily disengaged from the reel after it is wound thereon by sliding the cloth off the end of the reel, and these clamps being further so disposed with relation to the reel that they are carried in a recess formed in the reel-plate and do not project above the surface of the reel and therefore do not interfere with the proper measurement of the cloth or its easy removal.

My invention is illustrated in the accompanying drawings, wherein:—

Figure 1 is a perspective view of my invention looking down toward the top of the mechanism. Fig. 2 is a face view of a section of the measuring tape. Fig. 3 is a side elevation of the mechanism. Fig. 4 is a transverse section on the line 4—4 of Fig. 3. Fig. 5 is a face view of the cloth reel detached, the clamping jaws being closed. Fig. 6 is a perspective view of the system of levers for moving the roller 19 with relation to the roller 20. Fig. 7 is a perspective view of the tape guide, and Fig. 8 is a perspective view of the support for a bolt of cloth.

Corresponding and like parts are referred to in the following description and indicated in all the views of the accompanying drawings by the same reference characters.

Referring to these drawings it will be seen that my mechanism is supported upon two spaced frames 2. Each of these is preferably formed of angle-iron and comprises a horizontally disposed portion 3 having at one end the downwardly and outwardly extending leg 4. The other end of the horizontally disposed portion 3 is also provided with the downwardly extending portion 5 and is then extended horizontally as at 6, and again extended downwardly as at 7, so that the portions 5, 6 and 7 form substantially a leg supporting the portion 3 and corresponding to the leg 4, this leg being horizontally bent as at 6 for supporting the winding reel. There are two of these frames, as previously stated, which are spaced from each other by transversely extending braces 8 at each end. Other braces may be interposed between the frames at any convenient point, but these braces are not illustrated, as such illustration would tend to confuse the drawings.

Mounted upon the frames 2 and resting in bearings upon the horizontally disposed portion 6 of the frames is the cloth reel 10. This consists of a rectangular plate of any suitable material, but preferably of wood, this plate being mounted upon gudgeons 11 and 12 which pass through suitable bearings formed upon the horizontally disposed portions 6 of the frames. These bearings are so formed that the gudgeons 11 and 12 may be easily removed therefrom whenever desired. The extremity of the gudgeon 11 is formed with a many-sided head for engagement with the detachable crank 13, while the extremity of the gudgeon 12 is provided with a ratchet-wheel 14 with which a pawl 15 engages. This pawl is preferably a spring-actuated pawl and is adapted to be turned upward upon the portion 5 away from engagement with the ratchet wheel, and thus out of the way to permit an easy unwinding of the cloth and the removal of the reel 10 from the supporting frame. The means for holding the cloth upon the reel will be hereafter described.

Extending across the side-bars 3 of the frames 2 at the ends thereof adjacent to the reel 10 are the spaced parallel rods 16 which coact to form a scissors guide, the cloth to be measured and cut passes under these rods 16. Mounted on one of the frame-bars 2 and in alinement with the space between the parallel bars 16 is the index pointer 17. Mounted immediately in rear of the scissors guide 16 is the roller 18, over which the cloth passes, this roller being rotatably mounted upon the frame-bars 2. At the opposite ends of the portions 3 of the frame-bars are the upper and lower rollers 19 and 20, the lower roller 20 being rotatably mounted in suitable bearings in the frame-bars, while the upper roller is supported at its ends upon links 23 extending upward from arms 21. Each of these arms is pivoted at its middle, and the like ends of both arms connected by a transverse bar 22, so that a depression of the bar 22 will elevate the rear ends of the levers 21. Links 23 connect the ends of the levers 21 to the roller 19, and links 24 are also connected to the upper ends of the links 23 and extend downward and are pivoted to the side frames 2. Coil-springs 24ª act to draw down upon the links 24 and thus force the roller 19 downward against the roller 20. A latch 25 is supported upon the frames 2 intermediate of its ends, which latch engages with the cross-bar 22 when the cross-bar is drawn upward, the latch holding the roller 19 against the roller 20. The objects of the rollers 19 and 20 and of the roller 18 is to stretch the cloth smoothly and evenly as it passes from the rollers 19 and 20 to the roller 18. By lifting the roller 19 it will be obvious that the cloth may be easily inserted between the rollers and that when the rollers are closed down upon the cloth that they will exert sufficient friction incident to the cloth being wound up upon the reel plate 10 to straighten out and smooth the cloth.

Mounted upon a transversely extending shaft 26 is a tape reel 27 upon which a measuring and calculating tape 28 is wound. This tape after leaving the roller is carried rearward and under the roller 20, and back again between the rollers 19 and 20. From these rollers the tape extends forward and passes under or above the roller 18 then passes either over or under the scissors guide 16 and at the end is attached to the reeling plate 10. Thus, as the reeling plate 10 is rotated the tape will be wound therein, Located on each side of the path of travel of the tape 28 are the tape guides 29 which act to prevent the cloth from interfering with the tape and covering the same.

For the purpose of rotatably supporting the bolt of cloth so that it may be unwound and wound upon the reel plate 10 I have provided a U-shaped frame 30 through the arms of which pass the spindles 31. The spindles 31 carry at their ends the bolt-engaging members 32, preferably wedge-shaped, and are surrounded by the coil springs 33 which act to force the bolt-engaging members into the bolt of cloth. The extremity of each spindle is provided with a head 34 whereby the spindle may be manipulated. It will be seen that by retracting the spindles a bolt may be inserted between them, and that by releasing the spindles the members 32 will engage the bolt and rotatably support it so that the cloth may be readily drawn off therefrom.

It is necessary that the reeling plate 10 shall have a uniform thickness and width so that there shall be no protuberance at any one portion which shall cause the cloth to wind unevenly upon the reeling plate. For the purpose of clamping the end of the cloth upon the reeling plate I have provided certain clamping devices, the operating parts of which are arranged in a recess formed in the face of the reeling plate. Thus referring particularly to Fig. 5, it will be seen that the reel-plate is cut away as at 35 at an angle so that the reel-plate proper is tapered from one end to the other. The reel-plate is also provided with a transversely extending recess 36 and a recess 36ª communicating with the recess 36 and extending to the end of the reel 10. Mounted upon the reel-plate 10 is a spring clamping jaw 37. This jaw is rigidly attached to the plate at one end as at 37ª and then extends longitudinally along the plate to the other end of the plate and is then bent at right angles as at 37ᵇ, the extremity of the angular portion 37ᵇ being formed with a stud 37ᶜ extending into a recess formed in the end-wall of the plate. The resilient jaw so formed coacts with a movable jaw 38 which is pivoted at one end as at 38ª and extends nearly to the angular end 37ᵇ of the jaw 37. It is provided intermediate its ends with the arm 39 which extends into the recess 36 and is provided with a socket 39ª in which engages the rounded end of a jaw actuating lever 40 which is pivoted within the recess 36ª and does not project above the face of the plate 10. A spring 40ª is adapted to engage with the extremity of the lever 40 when thrown in its clamped position. In operation the end of the cloth to be reeled is placed between the clamping jaws 37, and 38, the clamping jaw 38 being then shifted out by moving the lever 40 to the position shown in Fig. 5, the end of the cloth being thereby clamped in place. After the cloth has been wound upon the reel 10 and it is desired to remove the cloth from the reel the lever 40 is released by pulling outward upon the spring 40ª and the jaw 38 drawn inward, whereupon it will disengage from the end of the cloth. The jaw 37 is also drawn inward at the same time against the force of its own resilience by contact of the end of the jaw 38 with the angular extremity 37ᶜ and thus the reel made narrower at one end than at the other to permit the cloth wound upon the reel to be easily removed therefrom.

In Fig. 2 I show a length of the measuring tape 28. The tape 28 is divided by lines into three longitudinal columns 41, 42 and 43. In one of these columns are disposed indicating marks indicating fractions of a yard or numbers of the yards. In the example shown the column 41 has indicating marks at each quarter of a yard, indicating a quarter of a yard, a half yard or three fourths of a yard, etc. The quarter yard is here taken as a unit, and a greater or less unit might be adopted if desired. The tape, of course, is of any desired length, and might be long enough to measure one-hundred yards or more if desired. The columns 42 and 43 are each divided into sections by separate division marks 44 which are located midway between the quarter yard marks. The spaces in the column 42 between the separate division marks 44 are each divided into a series of smaller spaces, each space containing a figure denoting different prices per yard of cloth. Thus, in the illustration, each of these spaces contained between the divisions 44 is further divided into equal spaces containing respectively the price marks 45, 40, 30, etc., indicating each a different price per yard of cloth. The column 43 is divided between the division marks 44 into a series of smaller spaces corresponding to the spaces in the column 42, each of these smaller spaces being provided with figures indicating the price per fraction of a yard, as for instance the price of a quarter of a yard. Thus, in the illustration shown, the column 43 above the figure indicating 45c. per yard is provided with figures "11¼ cts." indicating the cost of a quarter of a yard of cloth at the price of 45c. per yard, while above the figures 18 in the column 42 are the figures "4½ cts." indicating the price of a quarter of a yard of goods at 18c. a yard. It will be understood, of course, that this arrangement of the figures shall be carried out to the end of the tape so that for instance, opposite the figure indicating the price per yard, and located in the five yard space may be the price of five yards of goods at 45c. a yard.

The tape 28 is wound up on the reel plate 10 simultaneously with the cloth and as the tape passes under the pointer 17 the length of cloth wound up on the reel-plate may be easily read upon the tape 28 and its price seen by referring to the prices marked in the columns 42 and 43. It will thus be seen that there is no necessity of calculating the price for any fraction of a yard, as this price is displayed upon the measuring tape.

In the practical operation of my invention, the bolt of cloth is placed between the spindles 31 in the frame 30. The cloth is then passed between the rollers 19 and 20 carried over the roller 18 and either over or under the guide rods 16. The cloth is then carried downward and inserted between the clamping bars 37 and 38, the tape 28 being permanently attached to the reel plate in any suitable manner as by gluing the end of the tape to the edge of the reel plate. The crank 13 is then applied to the spindle 11 of the reel plate and the spindle rotated, winding up the cloth. The spring 15 engaging with the ratchet 14 prevents any back motion of the cloth winding reel. By reading the tape measuring 28 as it passes beneath the pointer 17, the proper amount of cloth may be easily seen, and when the proper amount has been reeled upon the plate 10, as indicated by said measure, scissors are inserted between the guide-bars 16 and the cloth cut. The cloth may then be removed from the reel-plate either by unrolling it or unshipping the reel-plate upon its bearing. The shaft 26 upon which the tape reel is mounted may be rotated to reverse the reel by means of a crank 45.

My invention is simple, easily operated and can be made in any size desired. It is intended to be somewhat over a yard in width so that a cloth of full width may be measured. It is however, equally adapted to be used for measuring ribbons, laces or like goods.

While I have shown what I believe to be the details of my invention, I do not wish to be limited to these details of construction as many minor changes might be made therein without departing from the spirit of the invention.

Having thus described the invention what is claimed as new is:—

1. A device for measuring fabrics including a fabric supporting reel a roller over which the fabric passes, a graduated tape attached to the reel and adapted to be wound up thereon as the fabric is wound up, and an indicating pointer co-acting with the tape, said tape being formed with longitudinally extending columns, one column indicating a predetermined unit of cloth measurement, another column divided into spaces each provided with characters indicating different prices per yard, the third column being divided into spaces corresponding to the second named column, each provided with characters denoting price per unit with reference to the cost per yard.

2. A cloth measuring mechanism including oppositely disposed frames, a rotatable winding reel mounted upon said frames and having means for clamping the end of a piece of cloth thereto, supporting rollers over which the cloth to be measured passes, a roller supported above one of the rollers and shiftable toward and from the same, resilient means for forcing the rollers toward each other, a measuring tape passing between said rollers and over the supporting rollers and attached at its end to the winding reel, and a reel upon which the measuring tape is mounted, and a scissors guide extending transversely of the direction of travel of the cloth and mounted upon said frames, said scissors guide intersecting the path of travel of the cloth and tape.

3. In a cloth measuring mechanism, oppositely disposed supporting frames, a rectangular reel plate mounted on said frames and having means disposed on its edge for clamping the end of a piece of cloth thereto, a scissors guide across which the cloth passes, a roller adjacent to the scissors guide for supporting the cloth, tension rollers at the opposite end of the frame from the scissors guide between which rollers the cloth passes, springs for forcing said tension rollers toward each other, means for moving the tension rollers away from each other when desired, means for supporting a bolt of cloth and allowing it to be unwound, a graduated measuring tape passing between the tension rollers and traveling across the scissors guide and attached to the reel plate, and an index pointer extending over the tape and disposed at the adjacent extremity of the scissors guide.

4. In a cloth measuring mechanism, a cloth reel comprising a rectangular plate over which the cloth is to be wound, means for rotating the plate, cloth clamping jaws mounted on the plate and relatively movable to each other and means on the plate for opening said clamping jaws, and means for reducing the width of the reel at one end when the clamping jaws are opened.

5. In a cloth measuring mechanism, oppositely disposed supporting frames, a cloth reel mounted on said frames and having means for clamping the end of a piece of cloth thereto, a scissors guide past which the cloth passes, tension rollers at the opposite end of the frames from the scissors guide between which the cloth passes, a channeled tape guide extending approximately from the tension rollers to the scissors guide, a graduated measuring tape passing between the guide rollers, supported in the tape guide, passing across the scissors guide and attached to said cloth reel, and an index pointer extending over the tape and disposed at the adjacent extremity of the scissors guide.

6. In a cloth measuring mechanism, a cloth reel comprising a rectangular plate over which the cloth is to be wound, said plate being tapered toward one end thereof, a resilient strip forming a jaw attached to the large end of the plate and extending along the tapered edge thereof, a jaw extending parallel to the spring strip and pivoted to the larger end of the plate, means on the plate for forcing said pivoted jaw outward or drawing it inward, and means whereby the pivoted jaw engages the spring jaw to retract the spring jaw and decrease the width of the reel at one end when the pivoted jaw is retracted.

7. In a cloth measuring mechanism, a cloth reel comprising a rectangular plate over which the cloth is to be wound, one edge of said plate being angularly cut away to taper the plate from one end to the other, a spring strip attached to the larger end of the plate, said strip extending parallel to the cutaway edge of the plate and forming a resilient jaw, the free end of the spring strip being bent toward the axis of the plate and then bent inwardly, a jaw pivoted to the large end of the plate and extending parallel to the spring strip on the inside thereof, said pivoted jaw having a length sufficient to permit the free end to engage the inwardly turned edge of the strip when the jaw is drawn inward, and means for forcing the pivoted jaw outward to clap a piece of cloth to the reel or retracting said jaw to release the cloth and retract the free end of the spring strip to reduce the width of the reel at one end.

8. In a cloth measuring mechanism, a cloth reel comprising a rectangular plate having one edge cut away to taper the plate from one end to the other, a resilient strip forming one jaw attached at the large end of the plate extending parallel to the cutaway edge thereof, the free end of the strip being bent toward the axis of the plate and then bent inwardly, a jaw extending parallel to the resilient jaw and pivoted at the larger end of the plate, said pivoted jaw having a length sufficient to permit its free end to engage the inwardly turned end of the resilient jaw when the pivoted jaw is retracted, an arm on the pivoted jaw extending into a recess in the plate, a lever pivoted in the recess in the plate and engaging the arm, said lever acting to retract the pivoted jaw, and a detent carried in said recess and adapted to engage the lever to hold it in adjusted position, said arm, lever and detent being all contained in said recess and flush with the face of the plate.

In testimony whereof, I affix my signature in presence of two witnesses.

GODTHFREY ELIN. [L. S.]

Witnesses:
A. W. SOUTHERLAND,
PEARL THORNQUIST.